F. S. SMITH.
APPARATUS FOR TREATING PRODUCTS BY DISRUPTIVE CONDUCTION.
APPLICATION FILED SEPT. 4, 1920.

1,399,162. Patented Dec. 6, 1921.

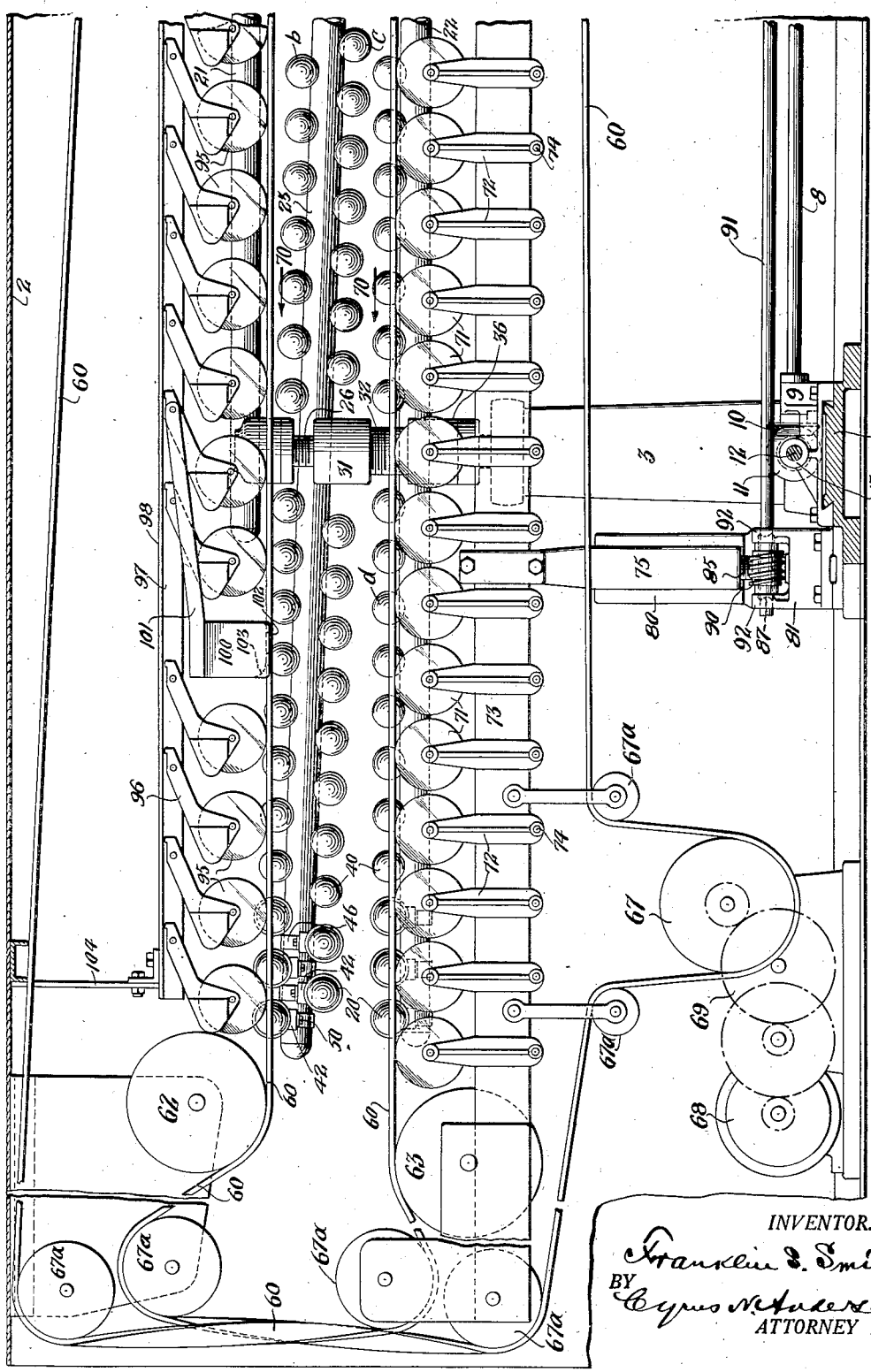

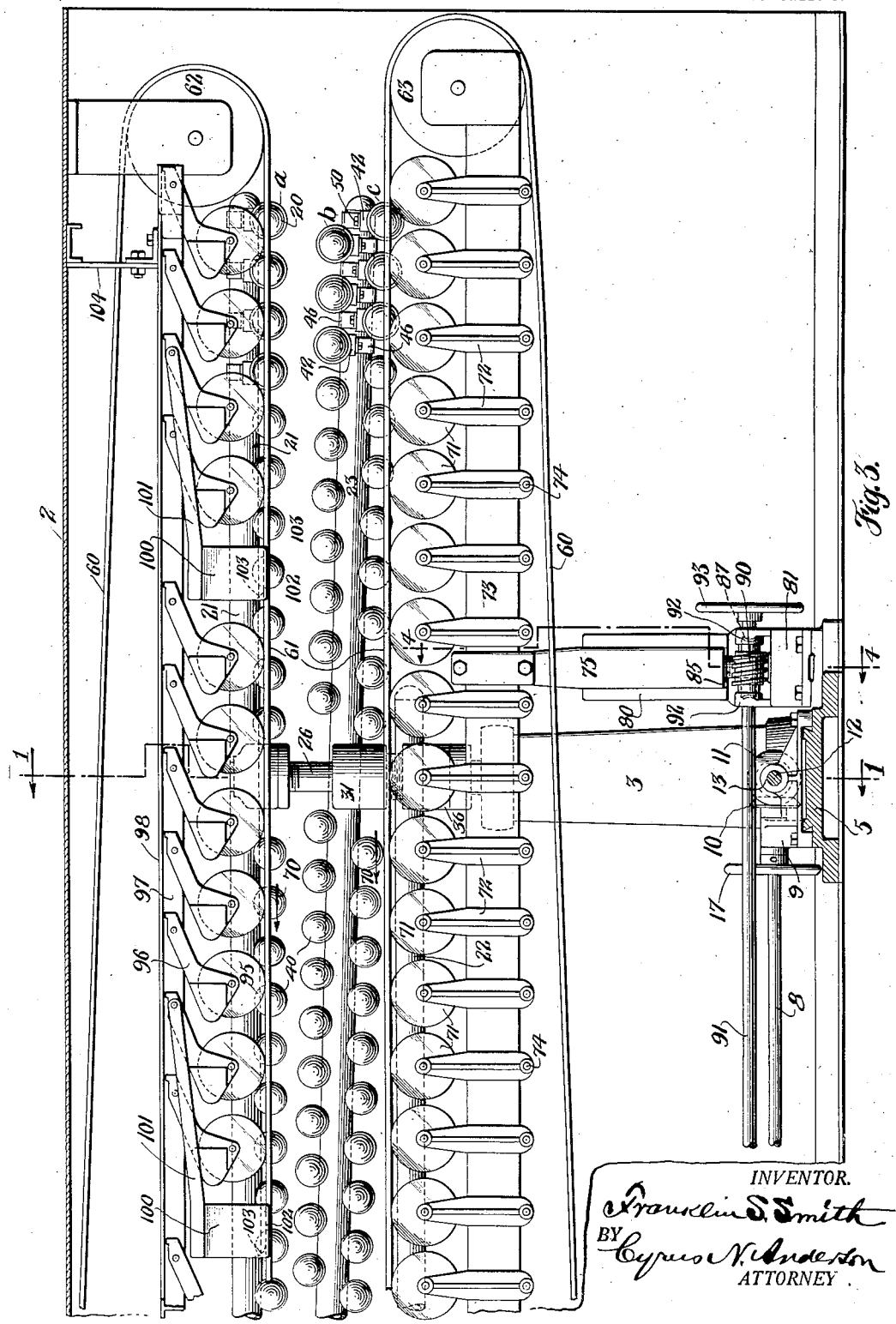

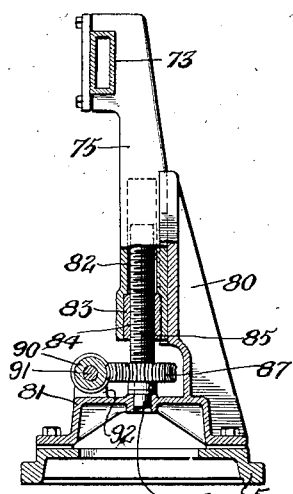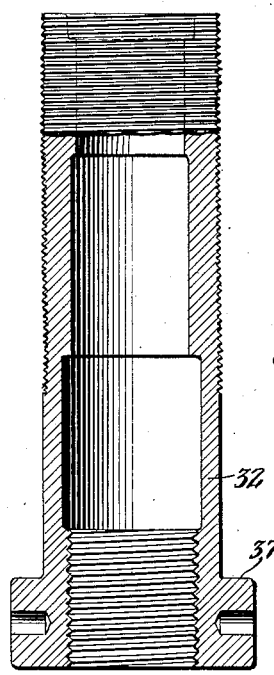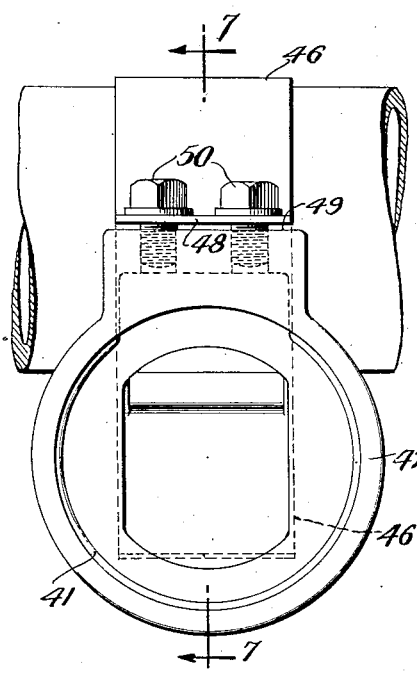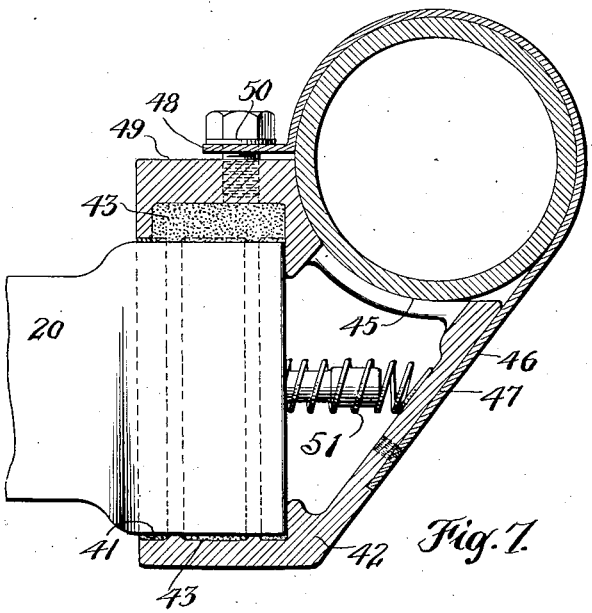

UNITED STATES PATENT OFFICE.

FRANKLIN S. SMITH, OF PHILADELPHIA, PENNSYLVANIA.

APPARATUS FOR TREATING PRODUCTS BY DISRUPTIVE CONDUCTION.

1,399,162.　Specification of Letters Patent.　Patented Dec. 6, 1921.

Application filed September 4, 1920.　Serial No. 408,356.

*To all whom it may concern:*

Be it known that I, FRANKLIN S. SMITH, a citizen of the United States, and a resident of Philadelphia, in the county of Philadelphia and State of Pennsylvania, have invented an Improvement in Apparatus for Treating Products by Disruptive Conduction, of which the following is a specification.

My invention relates to apparatus for treating products and articles of various kinds by disruptive conduction for the purpose of destroying insect life which may be present therein or for other purposes without injury to the product treated. By the words "Insect life" employed herein I intend to include not only the insect or imago but also the egg, larva and pupa.

Without attempting to enumerate all of the products which may be treated in and by the apparatus embodying my invention I may mention milled cereals, dried fruits, drugs, books and papers, leather, etc., also furs, woolens, etc. It is to be understood, however, that my invention is not limited or confined in its uses to the treatment of the products designated above for the purpose stated, but may be employed or used for the treatment of many other products for the purpose of destroying the insect life which may infest the same or for other purposes.

In the carrying out of my invention I provide a plurality of sets of electrodes and condensers arranged in sets or groups in opposed relation to each other.

Some of the objects of my invention are: to provide means whereby the condensers and electrodes may be relatively adjusted toward and from each other; to provide means whereby a single uninterrupted belt may be employed to convey or carry the products to be treated between the opposing groups of condensers and electrodes, thereby preventing relative slippage between the adjacent opposing sections of belt between which the said products are carried; to provide means whereby the spans of the conveyer belt, or other form of conveyer, by means of which the boxes or other objects to be treated are conveyed through the apparatus, may be adjusted toward and from each other to thereby accommodate boxes or other objects of different sizes; and to provide means whereby the rows of condensers and electrodes of each set may be relatively adjusted with respect to each other.

Other objects and advantages of my invention will be pointed out in the detailed description thereof which follows or will be apparent from such description.

With respect to the use of a single, uninterrupted belt or conveyer, it may be noted that heretofore where a plurality of belts have been employed, if one of them slipped thereby causing relative movement between the belts or other form of conveyer, the articles held between the opposing parts thereof would be caused to assume a twisted or abnormal position with respect to the said opposing parts. By the employment of a single belt or conveyer the possibility of this occurrence is avoided.

In order that my invention may be more readily understood and its practical advantages fully appreciated and comprehended, reference should be had to the accompanying drawings in which I have illustrated one form of a convenient embodiment thereof.

In the drawings:

Fig. 2 is a central longitudinal sectional view of one half of the machine taken on the line 2—2 of Fig. 1, portions of the machine being shown in elevation;

Fig. 3 is a similar view of the other half of the machine taken on the same line;

Fig. 4 is a sectional view taken on the line 4—4 of Fig. 3;

Fig. 5 is a view partly in longitudinal section and partly in elevation of an adjusting nut or sleeve for vertically adjusting certain parts of the apparatus;

Fig. 6 is a view in elevation of a bracket or socket member for supporting an electric condenser, a portion of the support for said bracket being also shown; and Fig. 7 is a transverse sectional view taken on the line 7—7 of Fig. 6.

Figure 1:
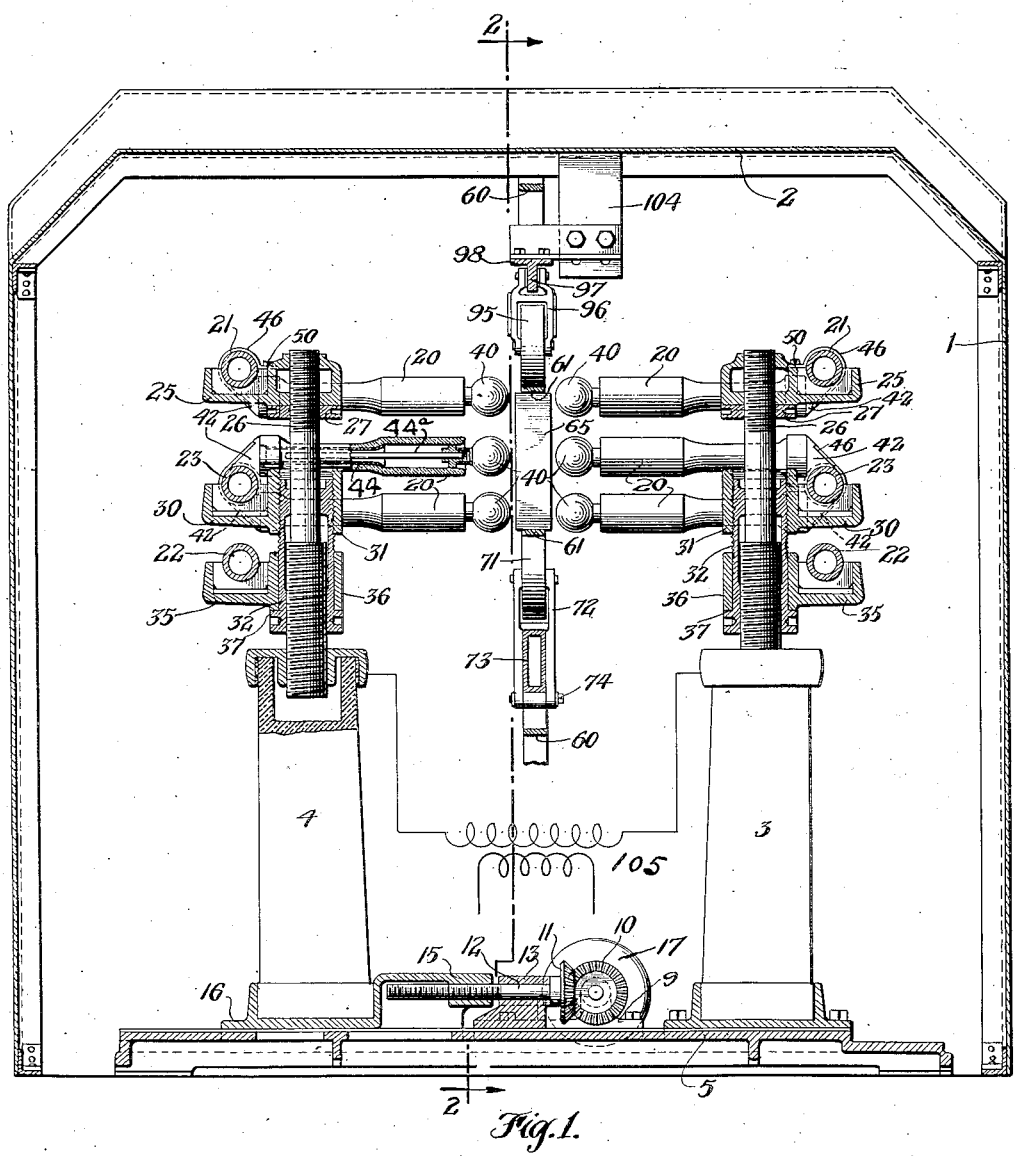
Figure 1 is a view in transverse section of the apparatus taken on the line 1—1 of Fig. 3, one of the electric condensers or capacities being shown partially in longitudinal section.

Referring to the drawings: 1 designates as a whole a metallic structure inclosing the apparatus. From the top 2 of the inclosure certain parts of the apparatus are supported as will be hereinafter described.

3 and 4 designate posts or standards of insulating material which are supported upon transversely extending sills or supports 5. There are two of these standards on each side of the apparatus as is indicated in Figs. 2 and 3, the standards 3 being on one side and the standards 4 being upon the other side, the said standards being relatively near each end of the apparatus and those upon one side being arranged in opposed relation with respect to those upon the other.

The standards 3 may be fixedly or stationarily secured to the transverse sills or supports 5; but, in the construction shown, the standards 4 are arranged to be adjusted in either direction longitudinally of the said sills or supports. For effecting or causing such adjustment I have provided the shaft 8 which extends longitudinally of the apparatus and which is supported in bearings in blocks 9 secured to the sills 5. The shaft 8 is provided with beveled gears 10 which engage beveled gears 11 upon the inner ends of screw threaded rods or shafts 12. Adjacent their inner ends these rods or shafts 12 are rotatably supported in bearings 13 in the blocks 9. The outer end portions of these rods or shafts 12 are screw threaded as shown and have screw threaded engagement with bracket-like portions 15 which are integrally connected with base portions 16 having sockets within which the lower ends of the standards 4 of dielectric material are secured. These base portions 16 have relatively wide under-cut grooves which fit correspondingly shaped portions upon the upper sides of the transverse supporting sills 5. The shaft 8 is adapted to be rotated by means of the hand wheel 17. Upon rotation of the said shaft in either direction the beveled gears 10 are rotated in like direction to effect rotation of the beveled gears 11 and the shafts or rods 12 supporting the same. Rotation of these shafts or rods effects adjustment in one direction or the other of the parts 15 and 16 which likewise effects adjustments in like direction of the standards 4 and the parts carried thereby.

The electric condensers or capacities 20 upon opposite sides of the apparatus are supported in four separate rows, the said rows being designated by the letters *a*, *b*, *c* and *d*. The top and bottom rows *a* and *d* at each side of the apparatus are supported upon longitudinal supporting bars 21 and 22, while the rows *b* and *c* upon each side of the apparatus are each supported upon a single longitudinally and diagonally extending bar 23. For the sake of lightness the bars 21, 22 and 23 are tubular.

The tubular supports 21 are secured upon brackets 25 which are adjustably supported upon the upper ends of metal supporting posts 26 which are adjustably supported by metal caps upon the upper ends of the supporting posts or standards 3 and 4 of insulating material. When the brackets 25 are once adjusted so as to position the electric condensers or capacities 20 carried by the supports 21 in the positions desired the said brackets may be allowed to remain in such position.

The tubular supports 23 upon opposite sides of the apparatus are supported upon brackets 30 extending outwardly from sleeves or collars 31 which have screw threaded connection with the exteriors of the upper ends of tubular sleeve-like nuts 32 the interiors of the lower ends of which have screw threaded connection with the lower end portions of the metal supporting posts 26 as shown.

The tubular supports 22 upon opposite sides of the apparatus are supported upon brackets 35 which project outwardly from sleeves 36 the lower edges of which rest upon shoulders 37 formed by enlargements upon the lower ends of the sleeve-like nuts 32. The pitch of the screw threads by means of which adjustable connection is effected between the sleeve-like nuts 32 and the lower end portions of the metal supports 26 is twice as great as that of the screw thread connection between the sleeves 31 and the exteriors of the upper end portions of the sleeve-like nuts 32.

In adjusting the sleeve like nuts 32 to raise or lower the tubular supports 22 and 23 and the electric condensers carried thereby, care should be taken to see that the supports 22 at opposite sides of the apparatus occupy positions in the same horizontal plane so that the rows of elastors carried thereby shall likewise occupy horizontal positions in opposed relation to each other.

When the sleeve-like nuts 32 are so adjusted the supports 23 upon opposite sides of the apparatus will likewise occupy positions in an inclined plane with the elastors or the electrodes thereof in opposed relation to each other.

It may be noted that each of the condensers 20 is provided with an electrode 40 which preferably is readily detachable or removable.

The outer end of each of the electric condensers extends into a socket 41 provided in a bracket 42 and is secured therein by means of cement 43. The said condensers are held in these sockets against either longitudinal or turning movement. The metal elements of the respective electric condensers comprise a tubular metal part 44 which covers the interior of one end portion of the dielectric casing and a rod $44^a$ which is situated in the other end portion thereof and projects into said tube as shown and is concentric therewith and with the said casing. The electrode 40 of each condenser is connected with a metal part having connection with said rod. The gaps between opposing electrodes are connected in multiple.

The space within the casing of each condenser is filled with a suitable dielectric, such as paraffin oil, a gas, or a mixture of gases, having a dielectric strength greater than that of the dielectric, air, in the gaps between the opposing electrodes 40. The condenser dielectric strength must be high enough to prevent corona or rupture otherwise the product being treated will be damaged.

In order to secure or fasten the brackets 42 to the tubular supports 21, 22 and 23, I have provided the said brackets with arcuate seats 45. 46 designates a metallic band connected in any suitable manner, preferably by electric welding, to the upwardly inclined outer side portion 47 of the bracket 42. The said metal straps extend around the supports 21, 22 and 23 as indicated in Figs. 1, 6 and 7 of the drawings, and terminate at their ends in a straight projecting portion 48 which is situated in parallel relation to the top surface portions 49 of the brackets 42. The portion 48 of each strap is clamped underneath the heads of the screw bolts 50 so as to draw and clamp the said straps tightly against and partially surrounding the respective tubular supports 21, 22 and 23. It will be seen that by this arrangement the brackets and consequently the condensers 20 supported thereby can be adjusted readily about the said supports 21, 22 and 23. It may be stated here that the tubular supports 21, 22 and 23 are secured in relatively fixed positions to the brackets 25, 30 and 35 so that when once placed or secured in position thereon there is no relative change between these parts.

The tubular elements 44 of the condensers 20 have electrical connection with the brackets 42 and the supports therefor through the springs 51.

In order to conduct products for treatment between the opposite groups of electrodes 40 I have provided an endless belt carrier 60 having spans 61 which extend between the rollers 62 at the opposite ends of the upper side of the apparatus and rollers 63 at the opposite ends of the lower side thereof. In the construction as shown the articles being treated are contained in boxes or cartons 65, one of which is shown in Fig. 1 of the drawings. Traveling movement of the endless carrier belt 60 is effected by means of a driving wheel 67 driven from a motor 68 through intermediate gearing 69. The belt is also supported and guided over rollers 67ª as shown in Fig. 2 of the drawings. The intermediate spans 61 of the belt travel toward the left, having reference to Figs. 2 and 3 of the drawings, in the direction indicated by the arrows 70 on these figures.

The underneath span or portion 61 of the endless carrier belt rests and is supported upon rollers 71 of suitable dielectric material, such for instance as glass. These rollers are rotatably supported in the upper ends of brackets 72 which are secured upon a rectangular hollow or tubular support 73. These brackets 72 are secured to the supports 73 by means of bolts 74. The support 73 should be adjustable in order to adjust the rotatable wheel 71 to different heights in order to effect movement of the lower span 61 toward or from the upper span 61. The roller support 73 is supported upon adjustable supports 75 situated at approximately the longitudinal center of the machine or apparatus. There are two of these supports 75, each of which is slidably supported and guided in an under cut groove formed in one side of each of the supporting brackets 80 which extend upwardly from the base portion 81. The base portions 81 are supported upon projections which extend laterally from the supporting sills 5. Each of the supports 75 is provided with an opening 82 which extends upwardly from the lower end thereof. The lower end of each of these openings 82 is enlarged as indicated at 83 and in this enlargement a sleeve 84 is situated which is in screw threaded engagement with a screw threaded shaft 85 the lower end of which is supported in an opening 86 in the upper side of the supporting base 81. Each of the adjustable supports 75 rests upon the upper end of a sleeve 84. Each of the shafts 85 is provided with a worm wheel 87 which is in engagement with a worm 90 upon a rotatable shaft 91. This shaft is supported in bearings 92 as shown in Figs. 2 and 3. The hand wheel 93 is provided upon one end of the shaft 91 by means of which the latter is rotated to effect rotation of the worms 90 to in turn effect rotation of the worm gears 87 upon the lower ends of the shafts 85. Simultaneous rotation of the worm gears 87 and shafts 85 is effected by rotation of the shaft 91, to effect simultaneous vertical adjustment either up or down of the adjustable supports 75, to raise or lower the rollers 71 and thereby effect raising or lowering of the lower span 61 of the carriers.

To hold the upper span 61 of the carrier belt firmly down upon the upper ends or sides of the cartons or containers I have provided the rollers 95 of suitable dielectric material, such as glass, which are rotatably supported upon the lower ends of the downwardly inclined arms or brackets 96 which are pivotally secured to the web portion 97 of the T-iron 98. Contact of the upper outer ends of the arms or brackets 96 with the under sides of the flanges of the T-iron 98 limits the downward swinging movement of the said arms and brackets and the wheels or rollers carried thereby.

In case there should be no cartons in place between the spans 61 of the carrier belt, the upper span would fall away from the rollers 95. In order that the upper span 61 may be guided and held in proper alinement I have provided the guides 100 which are supported upon arms 101, also pivoted to the web portion 97 of the T-iron 98. In the construction as shown I have provided three of these guides, one situated toward the right hand or front end of the machine, another near the center thereof and the other adjacent the rear or delivery end of the machine. These guides are each provided with flanges 102 at their lower ends which occupy positions upon opposite sides of the edges of the upper span 61 of the carrier belt. These flanges are of a depth slightly less than the thickness of the belt, as indicated in Figs. 2 and 3 of the drawings. The rear edges of the portions of the guides intermediate the flanges 102 are beveled or rounded off as indicated in dotted lines at 103. This rounded off or beveled portion rests against the upper span 61 of the belt when the latter sags, which occurs or is likely to occur when there are no boxes or cartons between the spans 61.

The T-iron 98 is supported upon brackets 104 which depend from the top portion 2 of the inclosure or cover for the machine.

In assembling the machine the supports 21 are adjusted to positions to support the electric condensers or capacities 20 with the center of the electrodes 40 thereof in substantial alinement with the lower side of the upper span 61 of the carrier. When once so adjusted the supports 21 and the condensers 20 and the electrodes carried thereby are allowed to remain permanently in this position.

It will be understood, however, that it may be desired to treat products contained in cartons or boxes of different sizes, and that in consequence adjustments of the distance between the spans 61 of the carrier are necessary, as are also adjustments of the condensers 20 and their electrodes 40 which are carried upon the supports 22 and 23. The means for and manner of vertically adjusting the rollers 71 and the bottom span 61 of the carrier have already been described; also the means for and manner of adjusting the supports 22 and 23 have been described.

Reference has been made already to the fact that the pitch of the screw threaded connection between the respective sleeves 31 and the exterior upper portions of the sleeve-like nuts 32 is one half of the pitch of the screw threaded connection between the interiors of the said nuts 32 and the exteriors of the metal supports 26. Therefore it will be observed that upon the turning of the nuts 32 in directions to cause upward or downward movement thereof upon the supports 26 corresponding movements of the sleeves 31 will be effected but through only half the distance moved by the nuts 32. Assume that one of the sleeve-like nuts 32 is turned to the left so as to cause downward movement upon its support 26. Turning or rotating the same in such direction will cause it to screw or back out of the sleeve 31 carried thereby and cause relative upward movement of said sleeve upon the said nut at a speed one half that of the downward movement of the said nut. A reverse relative movement of said sleeve upon said nut 32 will be effected when said nut is turned in the opposite direction. It is necessary to provide for this difference in the speed and distance of adjustment between the sleeves 31 and 36 and the parts 22 and 23 carried thereby otherwise the opposite ends of the said part 23 and of the parts carried thereby might, under certain conditions, contact with other adjacent portions of the apparatus.

It may be noted that in adjusting the parts 22 and 23 vertically in either direction in the manner as above described the angles between the parts 22 and 23 at the opposite sides of the apparatus are not altered or varied.

The opposing sets of condensers are connected through the springs 51, the brackets 42, the supports 21 to 23 and the posts 26 to the opposite sides of the secondary of a step up or transformer 105. The condensers of each set are connected in multiple while those of opposing sets are connected in series through the spark gap between the opposing electrodes 40 thereof. This arrangement obviously results in three sets of gaps in series, or in fact in three sets of condensers in series. The desired result, as will be obvious to those skilled in the art, may be obtained by the employment of only one set of condensers 20, resulting in two sets of gaps in series, or in fact, in two sets of condensers in series.

Although in the apparatus as illustrated a high tension alternating current is employed it will be understood that a high tension unidirectional current may be employed instead.

The operation of my invention may be described as follows: The voltage of the secondary coil of the transformer 105 is applied across the apparatus; that is, through the sets of condensers or capacities, as hereinbefore described. When the voltage reaches the disruptive value the air in the spark gaps between the electrodes 40 breaks down so that current exists. Upon the breaking down of the air it becomes conducting so that most of the applied voltage is placed on the dielectrics of the condensers with a proportional part on the conveyer belt and on the pasteboard carton, assuming that the product or article being treated is inclosed within such carton.

The presence of electrical capacity or condensers in the circuit in series with the gap in which the products are treated distributes the potential drop and limits the voltage gradients and current density across the said gap to values sufficiently high to destroy insect life which may be present in the products being treated but insufficient to injure the products or to rupture the containers thereof, should the said products be treated while in containers.

Having described my invention, what I claim and desired to secure by Letters Patent is:

1. In an apparatus of the character described, the combination of opposing sets of electrodes, an endless conveyer for conveying articles to be treated between said sets of electrodes, said conveyer comprising parallel portions between and by which the articles to be treated are carried and supported.

2. In an apparatus of the character described, the combination of sets of electrodes arranged in opposed relation with respect to each other, and an endless conveyer having parallel portions situated intermediate the said sets of electrodes, said parallel portions being adapted to support and carry articles to be treated between the said electrodes.

3. In an apparatus of the character described, the combination of sets of condensers and electrodes connected therewith, said sets of condensers and electrodes being arranged in opposed relation to each other, an endless conveyer for conveying articles to be treated between the said electrodes, said conveyer having portions arranged in parallel relation to each other and situated between the opposing sets of electrodes which portions are adapted to support and carry the said articles between the said electrodes.

4. In an apparatus of the character described, the combination of sets of electrodes arranged in opposed relation to each other, means for conveying articles to be treated between said electrodes, means for relatively adjusting the said sets of electrodes toward and from each other, and means for relatively adjusting the electrodes of each set with respect to each other.

5. In an apparatus of the character described, the combination of sets of condensers and electrodes connected to the said condensers, said sets of electrodes and condensers being arranged in opposed relation to each other, means for supporting the said condensers and electrodes, means for relatively adjusting the said condensers and electrodes toward and from each other, and means for conveying articles to be treated between the said electrodes.

6. In an apparatus of the character described, the combination of sets of condensers and electrodes having connection with said condensers, said sets of condensers and electrodes being arranged in opposed relation to each other, an endless conveyer having portions supported in parallel relation to each other, said portions being situated in the space between the opposing sets of electrodes, and means for causing relative movement of the said portions of the conveyer toward and from each other.

7. In an apparatus of the character described, the combination of a plurality of sets of condensers and electrodes, said sets being arranged in opposed relation with respect to each other, means for effecting relative adjustment of the said sets with respect to each other, an endless conveyer for conveying articles to be treated between the opposing sets of electrodes, said conveyer comprising portions which are arranged in parallel relation to each other intermediate the said electrodes, and means for causing relative adjustment of the said parallel portions toward and from each other.

8. In an apparatus of the character described, the combination of two sets of condensers and electrodes having connection with said condensers, said sets of condensers and electrodes being arranged in opposed relation with respect to each other, means for connecting in multiple the condensers of each set, a plurality of supports of insulating material for supporting each set of condensers, and means for relatively adjusting the supports for said sets of condensers so as to cause relative movements of said sets toward and from each other.

9. In an apparatus for treating products of various kinds to destroy insect life which may be present therein and for other purposes, the combination of one or more sets of electric condensers, each set being provided with spark electrodes and the said condensers being arranged in rows, bars extending longitudinally of the said apparatus for supporting the said rows of condensers and electrodes, the upper and lower bars being arranged in parallel relation with respect to each other and the intermediate bar being inclined at an angle with respect to the said upper and lower bars, and means for effecting adjustment of the said bars.

10. In an apparatus of the character described, the combination of sets of electrodes arranged in opposed relation with respect to each other, an endless conveyer belt having parallel portions situated intermediate the said sets of electrodes, said parallel portions being adapted to support and carry products to be treated between the said electrodes, means for supporting the lowermost of said parallel portions, and means resting upon the uppermost of said parallel portions for holding the same against the products to be treated.

11. In an apparatus of the character described, the combination of two sets of electrodes arranged in opposed relation with respect to each other, an endless conveyer having parallel portions situated intermediate the said sets of electrodes, the said parallel portions being adapted to support and carry products to be treated between the said electrodes, vertically adjustable means for supporting the lower parallel portion of said belt, and means resting upon the upper parallel portion of said belt to hold the same against the products being treated.

12. In an apparatus of the character described, the combination of sets of electrodes arranged in opposed relation with respect to each other, an endless conveyer having parallel portions situated intermediate the said sets of electrodes, said parallel portions being adapted to support and carry products to be treated between the said electrodes, means for supporting the lower of the said parallel portions, means for adjusting the said supporting means to raise or lower the said lower parallel portion, and yielding means resting upon the upper of said parallel portions for holding the same against the products being treated.

13. In an apparatus of the character described, the combination of sets of electrodes arranged in opposed relation with respect to each other, an endless conveyer having parallel portions situated intermediate the said sets of electrodes, said parallel portions being adapted to support and carry products to be treated between the said electrodes, means for supporting the lower of the said parallel portions, and means in contact and engagement with the upper of said parallel portions for guiding and holding the same in alinement when no products are present for treatment between the said parallel portions.

14. In an apparatus of the character described, the combination of one or more sets of condensers, bars for supporting the condensers of said set or sets in rows, the upper and lower bars being arranged in parallel relation to each other and the intermediate bar being arranged diagonally with respect to the upper and lower bars, and means for simultaneously adjusting two of said bars in the same direction, the speed of movement of the intermediate bar being less than that of the other bar.

15. In an apparatus of the character described, the combination of one or more sets of condensers, bars for supporting the condensers of said set or sets in rows, the upper and lower bars being arranged in parallel relation to each other and the intermediate bar being arranged diagonally with respect to the upper and lower bars, means for simultaneously adjusting the intermediate bar and one of the other bars in the same direction with respect to the other of said bars, and means for causing the intermediate bar to move at a less rate of speed than the other of said bars in the operation of adjusting the said two bars.

16. In an apparatus of the character described, the combination of one or more sets of condensers, bars for supporting the condensers of said set or sets in rows, the upper and lower bars being arranged in parallel relation to each other and the intermediate bar being arranged diagonally with respect to the upper and lower bars, means for simultaneously adjusting the intermediate bar and one of the other bars in the same direction with respect to the other of said bars, and means for effecting movement of the said intermediate bar through one-half the distance through which the other of said bars is moved during the adjustment operation.

In testimony that I claim the foregoing as my invention, I have hereunto set my hand this 27th day of August, A. D. 1920.

FRANKLIN S. SMITH.